US005725716A

United States Patent [19]

Payne

[11] Patent Number: 5,725,716
[45] Date of Patent: Mar. 10, 1998

[54] STRUCTURE FORMING METHOD AND APPARATUS

[76] Inventor: LeRoy Payne, 3300 Nicholas La., Molt, Mont. 59057

[21] Appl. No.: 714,086

[22] PCT Filed: May 4, 1995

[86] PCT No.: PCT/US95/05450

§ 371 Date: Sep. 9, 1996

§ 102(e) Date: Sep. 9, 1996

[87] PCT Pub. No.: WO95/30541

PCT Pub. Date: Nov. 16, 1995

Related U.S. Application Data

[63] Continuation-in-part of Ser. No. 239,540, May 9, 1994, Pat. No. 5,496,434, which is a continuation-in-part of Ser. No. 870,927, Apr. 20, 1992, Pat. No. 5,330,603, which is a continuation-in-part of Ser. No. 753,344, Aug. 30, 1991, Pat. No. 5,145,282, which is a continuation-in-part of Ser. No. 521,442, May 10, 1990, Pat. No. 5,049,006, which is a continuation-in-part of Ser. No. 417,501, Oct. 5, 1989, Pat. No. 4,955,760, which is a continuation-in-part of Ser. No. 235,205, Aug. 23, 1988, Pat. No. 4,875,784.

[51] Int. Cl.⁶ .............. B32B 31/00; B32B 31/06; B32B 31/08; B32B 31/12
[52] U.S. Cl. .............. 156/276; 156/324; 156/500; 156/538; 156/547; 156/549; 156/550; 427/138; 427/139; 427/186
[58] Field of Search .............. 156/550, 547, 156/549, 538, 500, 276, 87, 324, 307.7; 118/126, 123, 688–690, 708, 419, 420; 427/186, 138, 139

[56] References Cited

U.S. PATENT DOCUMENTS

| 2,193,472 | 3/1940 | Bothe et al. | 118/126 |
| 2,648,619 | 8/1953 | Alderfer | 118/123 |
| 3,245,329 | 4/1966 | Nagin et al. | 427/139 X |
| 4,955,760 | 9/1990 | Payne | 156/550 X |
| 5,496,434 | 3/1996 | Payne | 156/500 |

*Primary Examiner*—Jeff H. Aftergut
*Attorney, Agent, or Firm*—Arthur L. Urban

[57] ABSTRACT

A method of forming a continuous structure including the steps of preselecting a liquid reactive resin material, a particulate solid additive material, a porous blanket, and a thin fibrous sheet. The additive particles are mixed with the liquid resin material substantially continuously in a proportion significantly greater than that of the liquid resin material thereby encapsulating the additive particles. A pool of the resulting mixture is formed between the blanket and the sheet and the blanket and the sheet are advanced at a rate sufficient to maintain a suspension of the additive particles in the pool. Part of the liquid forming material is migrated through the blanket and the sheet in a uniform manner. An apparatus for carrying out this processing is also provided.

20 Claims, 1 Drawing Sheet

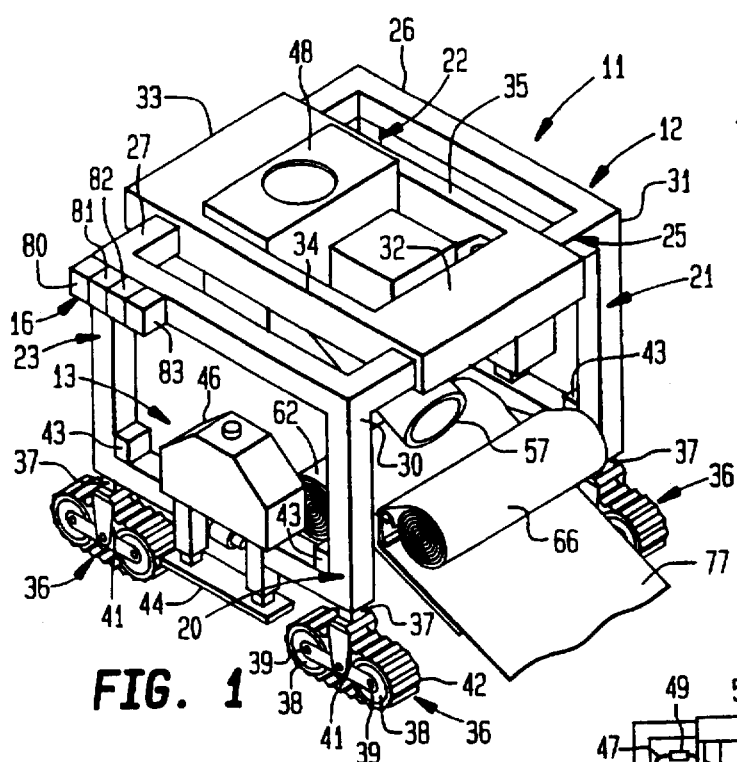
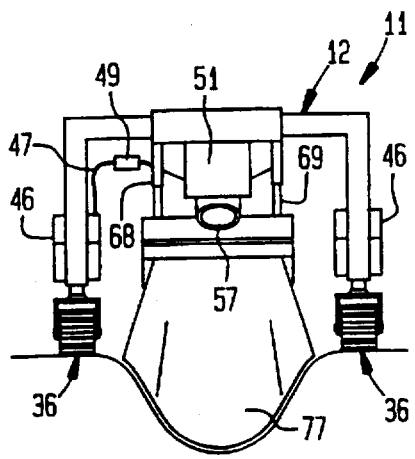
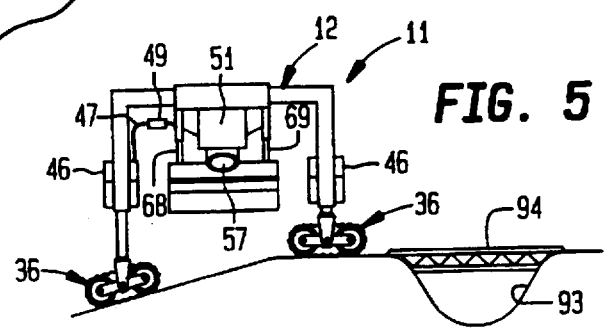
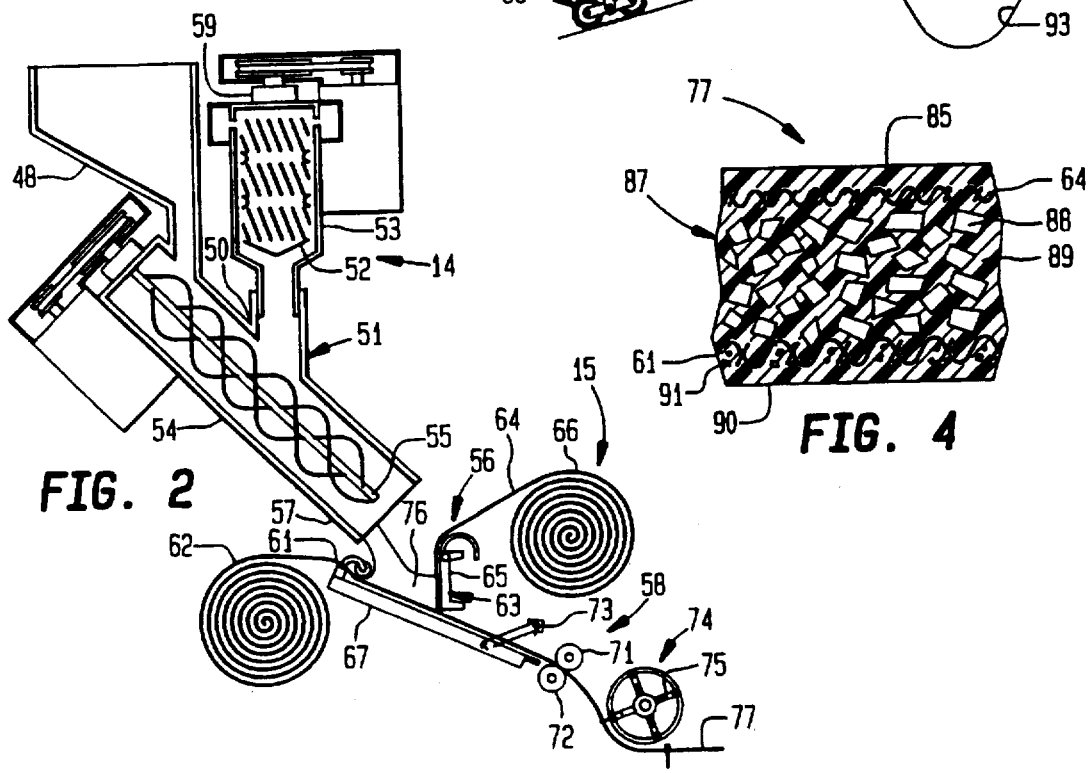

STRUCTURE FORMING METHOD AND APPARATUS

This application is a continuation-in-part of application Ser. No. 08/239,540 filed May 9, 1994, now U.S. Pat. No. 5,496,434, which in turn is a continuation-in-part of application Ser. No. 07/870,927, filed Apr. 20, 1992, now U.S. Pat. No. 5,330,603, which in turn is a continuation-in-part of application Ser. No. 07/753,344, filed Aug. 30, 1991, now U.S. Pat. No. 5,145,282, which in turn is a continuation-in-part of application Ser. No. 07/521,442, filed May 10, 1990, now U.S. Pat. No. 5,049,006, which in turn is a continuation-in-part of application Ser. No. 07/417,501, filed Oct. 5, 1989, now U.S. Pat. No. 4,955,760, which in turn is a continuation-in-part of application Ser. No. 07/235,205, filed Aug. 23, 1988, now U.S. Pat. No. 4,872,784.

This invention relates to a novel continuous structure forming method and apparatus and to a new continuous structure produced thereby.

The inventions of the applicant's early patents listed above provide novel methods and apparatus to produce at a job site structures such as liners and pipe for the collection, storage and/or distribution of water and other liquids. The apparatus employed, which normally is transported to a job site, is complex and sophisticated requiring major capital investment.

The invention of applicant's latest application listed above, Ser. No. 870,927, filed Apr. 20, 1992, provides a novel method and structure that can be produced with a minimum of machinery at the job site. Thus, the structure and method of the invention can be employed efficiently and economically for patching and for small jobs even at remote locations.

While the applicant's earlier patents mention the use of recycled or waste materials as additives in structures, most efforts of others have been directed to separating the waste into its primary components and the combining of similar materials into the same product again. Various governmental and private agencies have provided incentives such as subsidies and grants in attempting to develop commercially feasible products and procedures for recycling waste. To date, only very few waste materials are routinely recycled on an economical basis.

The present invention provides a novel method, apparatus and structure which overcome the shortcomings of previous expedients. In addition, the method, apparatus and structure provide features and advantages not found in earlier technology.

The structure produced with the method and apparatus of the invention can include major proportions of recycled, waste or other materials which are readily available at a job site. These structures are of high quality and may exhibit properties not usually found in products formed with conventional ingredients.

The method of the present invention may be conducted by individuals with only limited mechanical skills and experience. Structures can be produced by such individuals safely and efficiently without supervision. The configuration and composition of the structure can be changed easily.

The method of the invention can be modified to form a variety of different structures. Variations in physical dimensions, composition and surface appearance, etc. can be achieved. Even with such changes, uniform high quality can be maintained without difficulty.

A novel method of the present invention for forming a continuous structure includes the steps of preselecting a liquid reactive resin forming material, a particulate solid additive material, a porous blanket and a thin fibrous sheet. The additive particles are mixed with the liquid resin forming material substantially continuously in a proportion significantly greater than that of the liquid resin forming material. Substantially all of the additive particles are encapsulated with the resin forming material to a preselected thickness.

A pool of the resulting mixture is formed between the porous blanket and the fibrous sheet. The blanket and the sheet are advanced at a rate sufficient to create movement of the additive particles within the pool and maintain the additive particles in suspension. Part of the liquid resin forming material is migrated through the blanket and the sheet substantially uniformly prior to gelling of the liquid resin forming material to form a continuous resin matrix within the structure.

The additive particles advantageously are mixed with the liquid resin forming material as it is passed continuously through an elongated mixing chamber. Preferably, the mixture is deposited between the blanket and the sheet in a reciprocating motion across the width of the materials. The pool of the mixture advantageously is confined between the blanket and the sheet with an elongated barrier positioned close thereto and substantially transverse to the direction of the advance. The fibrous sheet which advantageously is a spot bonded fibrous sheet may be disposed between the barrier and the mixture with the sheet advantageously moving past the barrier and becoming an integral component of the structure.

Preferably, pressure is applied to the structure after it passes the barrier. The pressure advantageously is applied simultaneously across an entire width of the structure. A preselected pattern may be formed on a surface of the structure while pressure is applied thereto, preferably along an extended length thereof, such as by applying pressure for an extended period of time.

Benefits and advantages of the novel method, apparatus and structure of the present invention will be apparent from the following description of the accompanying drawings in which:

FIG. 1 is a view in perspective of one form of mobile continuous structure forming apparatus of the present invention;

FIG. 2 is a side view fragmentary in section of the structure forming apparatus of the invention shown in FIG. 1;

FIG. 3 is a front view of the structure forming apparatus of the invention shown in FIG. 1;

FIG. 4 is an enlarged fragmentary cross sectional view of the structure of the invention shown in FIG. 1; and FIG. 5 is a schematic illustration of a structure forming apparatus of the invention moving into position over a ditch.

As shown in the drawings, one form of novel mobile continuous structure forming apparatus 11 of the present invention includes a supporting portion 12, a raw material supplying portion 13, a mixing portion 14, a matrix forming portion 15 and a control portion 16.

The supporting portion 12 of the structure forming apparatus of the invention includes a plurality of spaced upstanding frame members 20, 21, 22, 23. The frame members are adjustable in length. A plurality of generally horizontally disposed frame sections 25, 26, 27, 28 join adjacent upper ends of the upstanding frame members. For example as shown in the drawings, frame section 25 extends between the upper end 30 of frame member 20 and the upper end 31 of frame member 21.

Opposed frame sections 25, 27 are of adjustable length. This may be accomplished as shown by dividing a frame section into two and partially overlapping adjacent free ends within a housing 32, 33.

Spaced support sections 34, 35 extend between opposed frame sections 25, 27 and particularly between the respective housing 32, 33 of each frame section. Mixing portion 14 and matrix forming portion 15 extend downwardly adjustably from the support sections between the upstanding frame members 20–23. Other components (not shown) such as an operator's seat, an electrical generator, an air compressor, a hydraulic pump and the like also can be mounted on and/or suspended from the frame sections and support sections.

Pivotable carriage means 36 extend downwardly from lower ends 37 of the upstanding frame members. Advantageously, the carriage means include wheels 38 rotatable on axles 39. The carriages preferably include variable drive means 41 and include endless track members 42. Drive means 43 advantageously adjust the length of frame members 20–23 and adjustable frame sections 25, 27.

The mobile structure forming apparatus 11 advantageously includes four spaced upstanding frame members and four frame sections forming a quadrangular assembly as shown in the drawings. Preferably, the apparatus 11 includes jack means 44 extending downwardly between the carriage means 36.

The raw material supplying portion 13 of the apparatus 11 includes a plurality of reservoirs 46 operatively connected with the supporting portion 12. The reservoirs are connected independently with the mixing portion 14 through flexible conduit means 47. The raw material supplying portion advantageously also includes a gravity feed hopper 48 adjacent the mixing portion 14 and preferably heating means 49 along the length of the flexible conduit means.

The mixing portion 14 of the structure forming apparatus 11 of the invention includes a generally vertically oriented elongated mixing chamber 51 mounted on the supporting portion 12. A first rotatable mixing element 52 is disposed within an upper section 53 of the mixing chamber as shown in FIG. 2.

The mixing chamber 51 also includes a lower section 54 which preferably is disposed at an obtuse angle to the upper section. A second open rotatable mixing element 55 is disposed within the lower section of the mixing chamber.

Advantageously, the hopper 48 is connected to the lower section 54 of the mixing chamber 51 adjacent the intersection 50 of the lower section 54 with the upper section 53. The first and second rotatable mixing elements 52, 55 respectively are centrally aligned within the upper and lower sections 53, 54 of the mixing chamber 51.

The matrix forming portion 15 of the apparatus 11 includes mixture distributing means 56 adjacent an outlet 57 of the mixing chamber 51. Pressure applying means 58 is disposed subsequent to the mixture distributing means 56. Advantageously, the matrix forming portion 15 includes means 59 reciprocating the outlet 57 of the mixing chamber across the width of a blanket 61 from roll 62 passing thereunder.

The mixture distributing means 56 preferably also includes an elongated barrier member 63 disposed closely adjacent to the path of blanket 61 and a fibrous sheet 64 advancing through the apparatus and substantially perpendicular to the direction of advance. Advantageously, the barrier member 63 as shown is an elongated blade member 65 inclined to the blanket and the sheet in the direction of advance. Fibrous sheet dispensing means shown as roll 66 preferably is disposed adjacent the barrier member 63.

The matrix forming portion 15 advantageously includes a shallow tray member 67 disposed below the outlet 57 of the mixing chamber 51 and below the path of the blanket 61 and the fibrous sheet 64 through the apparatus. Preferably, the tray member is disposed in a plane substantially parallel to a longitudinal plane through the lower section 54 of the mixing chamber. Advantageously, the tray member 67 is connected to supporting portion 12 through cylinders 68, 69 to simplify orientation of the tray.

The pressure applying means 58 preferably includes at least one roller shown in FIG. 2 as opposed rollers 71, 72 disposed perpendicular to the path of the blanket 61 and sheet 64 and extending beyond edges of the blanket. Roller 71 and/or 72 advantageously includes a patterned surface.

Alternatively, or in addition, the pressure applying means 58 may include a belt extending along the path of the blanket and particularly cooperating belts disposed above and below the blanket and sheet with one of the belts being a pattern forming belt. Most advantageously, cooperating belts are disposed in planes substantially parallel to tray member 67.

A cutter member 73 (FIG. 2) may be located along the path of the structure. Also, one or more rotatable wheels 74 preferably are mounted on brackets (not shown) extending forwardly from the supporting portion 12. These wheels are oriented to press edges of the structure against a supporting surface. Preferably, the wheels include hollow spoke members 75 which include pins or nails with mechanisms (not shown) that drive the pin through a structure edge and into the underlying supporting surface to fix the position of the structure.

To form a structure employing the method and apparatus of the invention as shown in the drawings, a liquid reactive resin forming material is advanced from a reservoir 46 through a conduit 47 into upper section 53 of mixing chamber 51. Simultaneously, other minor ingredients e.g. colors, catalysts, etc. from another reservoir advance through a conduit into upper section 53 and are mixed with the resin forming material advancing therethrough by first rotatable mixing element 52.

The resulting liquid mixture thereafter flows through the lower section 54 of the mixing chamber wherein a particulate solid additive material from hopper 48 flows into an upper end of the lower section 54. The additive particles join the liquid resin forming material advancing therealong and are mixed therewith by second open rotatable mixing element 55.

The additive particles are mixed with the liquid resin forming material substantially continuously in a proportion significantly greater than that of the resin forming material. During this mixing operation, substantially all of the additive particles are encapsulated with the liquid resin forming material to a preselected thickness.

The resulting mixture being delivered from outlet 57 of the mixing chamber 51 passes between blanket 61 and fibrous sheet 64 as they advance over tray member 67. With barrier member 63 closely adjacent to the blanket and sheet and disposed transversely across the width thereof (FIG. 2), a pool 76 of the mixture collects behind the barrier member. The blanket and sheet are advanced at a rate sufficient to create movement of the additive particles within the pool to ensure complete encapsulation and also to maintain the particles in suspension so the mixture adhering to the blanket and sheet is homogeneous.

As the blanket 61 and fibrous sheet 64 advance under the barrier member, excess mixture is removed and a substantially uniform preselected thickness is retained between the blanket and the sheet. Thereafter, part of the liquid resin forming material is allowed to migrate through the blanket and sheet to form a cross section as illustrated in FIG. 4 which will be described hereafter.

If it is desired to form a preselected patterned surface on the resulting structure, it is passed into contact with a patterned roller or belt or between a combination of opposed rollers 71, 72 or belts. Advantageously, a pattern is formed on the blanket surface by applying pressure to the structure for an extended period of time. This may be accomplished by using cooperating belts of considerable length.

To produce high quality structures of the invention, it is important that all of the steps be carefully coordinated by control portion 16. The control portion 16 of the structure forming apparatus 11 of the invention includes programmable memory means 80 and actuating means 81 responsive thereto in combination with coordinating means 82 to control the operation of pumps, valves and drives. Preferably, the coordinating means includes a process controller 83 that initiates changes in the flows of materials and speeds of drives to bring variations therein back to the rates specified in the programs present in the memory 80.

This coordination commonly is achieved through the transmission of information such as digital pulses from the monitors and/or sensors at the control components to the process controller 83. The operating information is compared with the preselected programming parameters stored in the memory 80. If differences are detected, instructions from the controller change the operation of the components to restore the various operations to the preselected processing specifications. Normal maneuvering of the apparatus to maintain it centered over a ditch can be accomplished by increasing the speed of the carriages 36 on one side and/or decreasing the speed of the carriages on the other side.

As shown in FIG. 4, a cross section of a typical structure of the invention 77 includes a thin continuous resin rich upper layer 85 over a thin fibrous sheet 64 under which is a central layer 87 including a plurality of encapsulated solid particles 88 e.g. particles from grinding discarded tires, within a continuous resin matrix 89. The resin matrix extends throughout the structure from the thin resin rich upper layer 85 through fibrous sheet 64 through particle rich central layer 87 downwardly through blanket 61 and into a thinner resin rich lower layer 90 including a few very small solid particles 91 disposed primarily closely adjacent to the blanket.

The inclusion of outer upper and/or lower plastic films may facilitate the installation of novel structures of the invention under adverse weather conditions or below water or other liquids. Also, the flowing of resin through film openings can provide adhesion of the structure to a subsurface (not shown).

FIG. 5 illustrates the movement of continuous structure forming apparatus of the invention. The apparatus 11 is prepared for movement to another ditch 93 by pivoting the carriages 36 ninety degrees from normal operating orientation as shown in FIG. 3 using jacks 44 to raise the carriages off the ground. The apparatus then is moved sideways up a grade and over a temporary ramp 94 until the apparatus straddles the ditch 93. Thereafter, the jacks 44 again raise the carriages 36 so they can be pivoted back to an orientation parallel to the ditch for resuming the ditch lining.

The same steps can be employed to move the apparatus around obstacles such as bridges, trees, head gates, etc. To change the width of the apparatus, the two carriages on one side can be pivoted and driven away from or toward the center of the apparatus and thereby lengthen or shorten the adjustable frame sections 25 and 27.

The liquid reactive resin forming material employed to produce structures of the invention is selected to be capable of reaction to form the particular resin matrix desired in the final structure. Advantageously, the resin matrix is a thermosetting resin such as a polyurethane or polyester. Should a polyurethane be desired, one reservoir may contain an isocyanate and another reservoir may contain a polyol. More commonly, the reservoirs may contain different partially formed materials which upon mixing interact to form the desired polyurethane. Examples of such partially formed materials include so-called "A stage" resins and "B stage" resins.

Other resin forming systems may utilize a resin forming material in one reservoir and a catalyst in a second reservoir. Additional components can be premixed with one of the resin formers, e.g. fillers, reinforcements, colors and the like.

The particulate solid additive material is mixed with the liquid reactive resin forming material substantially continuously in a proportion significantly greater than that of the resin forming material. The additive particles may be any of a wide variety of inexpensive materials readily available at a particular job site. Natural mineral particulate materials such as sand and gravel normally are available or can be produced simply by crushing rock at the site.

Also, materials such as waste or recycled materials which can be shredded or ground into particles of suitable size can be utilized. Particularly useful are particles formed by shredding or grinding discarded tires. Since the particles are encapsulated with the resin forming material and not saturated therewith, many different waste materials may be employed.

Suitable porous blankets include woven, knit, nonwoven structures, etc. The blankets e.g. fabrics, mats, etc. may be formed of continuous or discontinuous fibers, yarns, slit ribbons and similar natural and synthetic fibrous materials. Reinforcing members such as ropes, cables and the like that extend longitudinally and/or transversely of the blanket centerline may be included if desired.

The fibrous sheet includes products that utilize a major proportion of short fibers oriented predominately in a single plane. Preferably, the sheet is spot bonded at spaced points over its surface to provide strength along its major plane and general structural integrity.

The above description and the accompanying drawings show that the present invention provides a novel method, apparatus and structure which overcome the shortcomings of previous expedients and in addition, provide features and advantages not found in earlier technology.

The structure produced with the method and apparatus of the invention can include major proportions of recycled, waste or other materials which are readily available at a job site. These structures are of high quality and may exhibit properties not usually found in products formed with conventional ingredients.

The method of the invention may be conducted by individuals with only limited mechanical skills and experience to produce high quality structures safely and efficiently. The method can be modified to form a variety of different structures. Variations in configuration, composition, physical dimensions and surface appearance, etc. can be achieved easily. Even with such changes, uniformity and high quality can be maintained without difficulty.

It will be apparent that various modifications can be made in the particular method, apparatus and structure described in detail above and shown in the drawings within the scope of the present invention. The method steps, apparatus components and types of materials employed can be changed to meet specific process and structural requirements. For example, the number and disposition of porous blankets and patterns can be different. These and other changes can be made in the method, apparatus and structure of the invention provided the functioning and operation thereof are not adversely affected. Therefore, the scope of the present invention is to be limited only by the following claims.

I claim:

1. A method of forming a continuous structure including the steps of preselecting a liquid reactive resin forming material, a particulate solid additive material, a porous blanket, and a thin fibrous sheet, mixing said additive particles with said liquid resin forming material substantially continuously in a proportion significantly greater than that of said liquid resin forming material, encapsulating substantially all of said additive particles with said liquid resin forming material to a preselected thickness, forming a pool of the resulting mixture between said blanket and said fibrous sheet, advancing said blanket and said sheet at a rate sufficient to create movement of said additive particles within said pool and maintain said additive particles in suspension, migrating part of said liquid resin forming material through said blanket and said sheet substantially uniformly prior to gelling of said liquid resin forming material to form a continuous resin matrix within said structure.

2. A method of forming a continuous structure according to claim 1 including the step of confining said pool of said mixture between said blanket and said sheet by positioning an elongated barrier close to said blanket and said sheet and substantially transverse to the direction of advance.

3. A method of forming a continuous structure according to claim 1 including the step of applying pressure to said structure after it passes said barrier.

4. A method of forming a continuous structure according to claim 3 including the step of forming a preselected pattern on a surface of said structure while applying pressure thereto.

5. A method of forming a continuous structure according to claim 2 wherein said fibrous sheet continuously moves past said barrier.

6. A method of forming a continuous structure according to claim 1 wherein said fibrous sheet is a spot bonded fibrous sheet of extended length and becomes an integral component of said structure.

7. A method of forming a continuous structure according to claim 1 wherein said additive particles are mixed with said liquid resin forming material as it passes continuously through an elongated mixing chamber.

8. Mobile continuous structure forming apparatus including a supporting portion, a raw material supplying portion, a mixing portion, a matrix forming portion and a control portion; said supporting portion including a plurality of spaced upstanding frame members of adjustable length, a plurality of generally horizontally disposed frame sections joining adjacent upper ends of said upstanding frame members, one pair of opposed frame sections being of adjustable length, support sections extending between said adjustable opposed pair of said frame sections, pivotable carriage means extending downwardly from lower ends of said upstanding frame members, said mixing and matrix forming portions extending downwardly adjustably from said support sections between said spaced upstanding frame members; said raw material supplying portion including a plurality of reservoirs operatively connected with said supporting portion, said reservoirs being connected independently with said mixing portion through flexible conduit means; said mixing portion including a generally vertically oriented elongated enclosed mixing chamber disposed between said support sections, said mixing chamber including an upper liquid mixing section with a first rotatable mixing element disposed therein, said mixing chamber including a lower liquid/solid particle mixing section disposed below said upper mixing section and connected thereto at an obtuse angle, a solid particle feeding hopper connected to said lower mixing section at a point thereon above its connection with said upper mixing section, a second open rotatable mixing element disposed within said lower mixing section of said mixing chamber; said matrix forming portion including mixture distributing means adjacent an outlet of said mixing chamber, pressure applying means disposed subsequent to said mixture distributing means; said control portion including programmable memory means, coordinating means, sensing means, actuating means, and circuitry transmitting signals from said sensing means to said coordinating means for comparison with said memory means and activation of said actuating means to form and maintain a uniform resin matrix forming mixture with a preselected major proportion of solid particles and to form with said mixture a continuous resin matrix within said structure.

9. Mobile continuous structure forming apparatus according to claim 8 including four spaced upstanding frame members and four generally horizontally disposed frame sections forming a quadrangular assembly.

10. Mobile continuous structure forming apparatus according to claim 8 including drive means adjusting the length of said frame members and said frame sections.

11. Mobile continuous structure forming apparatus according to claim 8 including variable drive means adjacent each carriage means.

12. Mobile continuous structure forming apparatus according to claim 8 wherein said carriage means includes driven track units.

13. Mobile continuous structure forming apparatus according to claim 8 including adjustable jack means extending downwardly adjacent said carriage means.

14. Mobile continuous structure forming apparatus according to claim 13 including raw material reservoirs disposed adjacent said jack means.

15. Mobile continuous structure forming apparatus according to claim 8 wherein said matrix forming portion is pivotable with respect to said supporting portion.

16. Mobile continuous structure forming apparatus according to claim 8 including an elongated barrier member disposed closely adjacent to a path of a structure advancing through said apparatus and substantially perpendicular to a direction of advance.

17. Mobile continuous structure forming apparatus according to claim 16 wherein said elongated barrier member is an elongated blade member inclined to said structure in the direction of advance.

18. Mobile continuous structure forming apparatus according to claim 8 including a shallow tray member disposed below said mixture distributing means and below the path of said structure through said apparatus.

19. Mobile continuous structure forming apparatus according to claim 8 wherein said pressure applying means includes a patterned surface.

20. Mobile continuous structure forming apparatus according to claim 8 wherein said pressure applying means includes cooperating moving surfaces disposed above and below said structure.

* * * * *